United States Patent [19]

Daniels

[11] 4,264,049
[45] Apr. 28, 1981

[54] EASEL SUPPORT & CARRIER

[76] Inventor: Rose Marie P. Daniels, 2915 S. Eaton St., Denver, Colo. 80227

[21] Appl. No.: 5,243

[22] Filed: Jan. 22, 1979

[51] Int. Cl.³ ............................................. F16M 13/00
[52] U.S. Cl. .................................................... 248/444
[58] Field of Search ............... 248/444; 108/43; 2/340

[56] References Cited

U.S. PATENT DOCUMENTS

| | | | |
|---|---|---|---|
| 346,547 | 8/1886 | Holt | 248/444 |
| 615,480 | 12/1898 | Englund | 248/444 |
| 643,164 | 2/1900 | Schnell | 248/144 |
| 730,774 | 6/1903 | Kingsbury | 248/444 |
| 869,918 | 11/1907 | Lipscond | 248/444 |
| 967,218 | 8/1910 | Moody | 248/444 |
| 1,287,112 | 12/1918 | Rotter | 2/340 X |
| 1,593,166 | 7/1926 | Flach | 248/444 |
| 2,353,378 | 7/1944 | White | 2/340 |
| 2,863,256 | 12/1958 | Hegarty | 248/444 |
| 3,090,330 | 5/1963 | Best | 108/163 |
| 3,363,814 | 1/1968 | Hall et al. | 248/444 UX |

Primary Examiner—William H. Schultz
Attorney, Agent, or Firm—John E. Reilly

[57] ABSTRACT

An easel includes a drawing board equipped with flexible straps for stabilizing and supporting the drawing board in different positions with respect to a person's body; such as, for instance, depending upon whether the person is in a standing or reclined position. A first adjustable length strap is adjustably secured at both ends to respective opposite lateral sides of the board toward the rear portion of the board and is adapted to pass around the person's neck or back. A second strap is adjustably attached to and can extend downwardly either from the front portion of the board in order to pass around the person's foot, or it can be partially draped over the top surface of the board and downwardly over the rear edge of the board so that both ends of the strap pass under the person's foot for additional stability.

11 Claims, 5 Drawing Figures

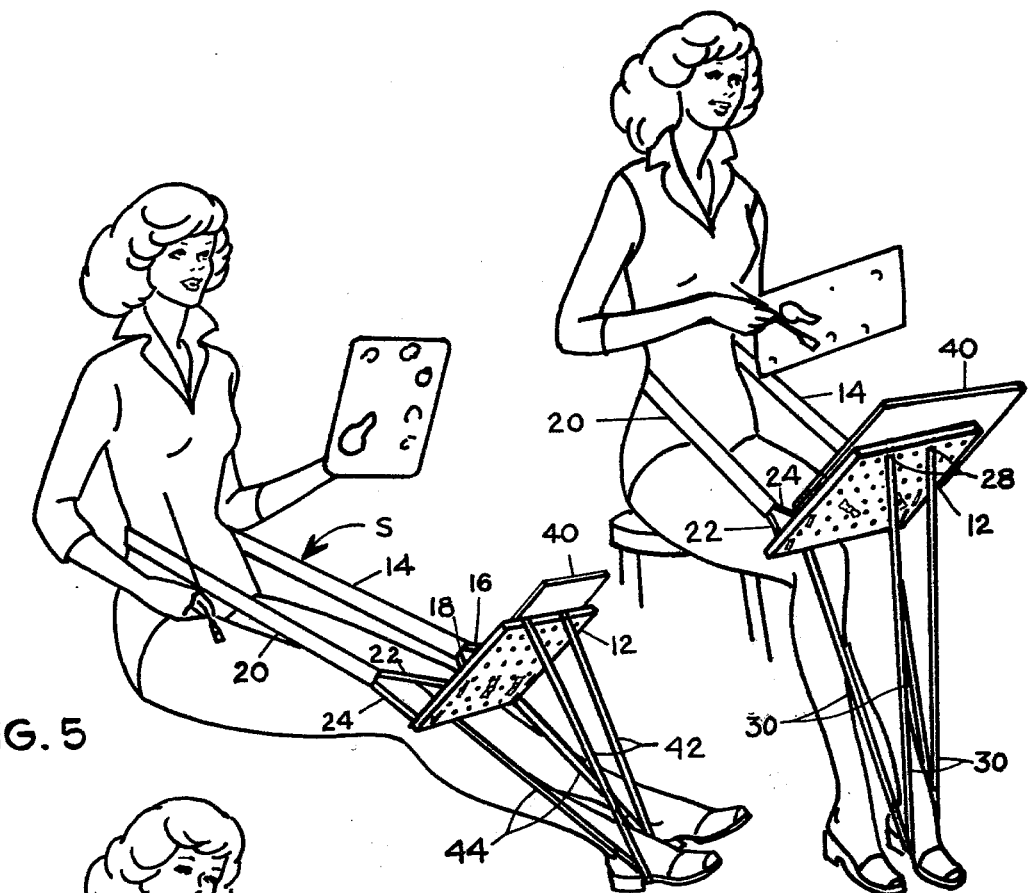
FIG. 4
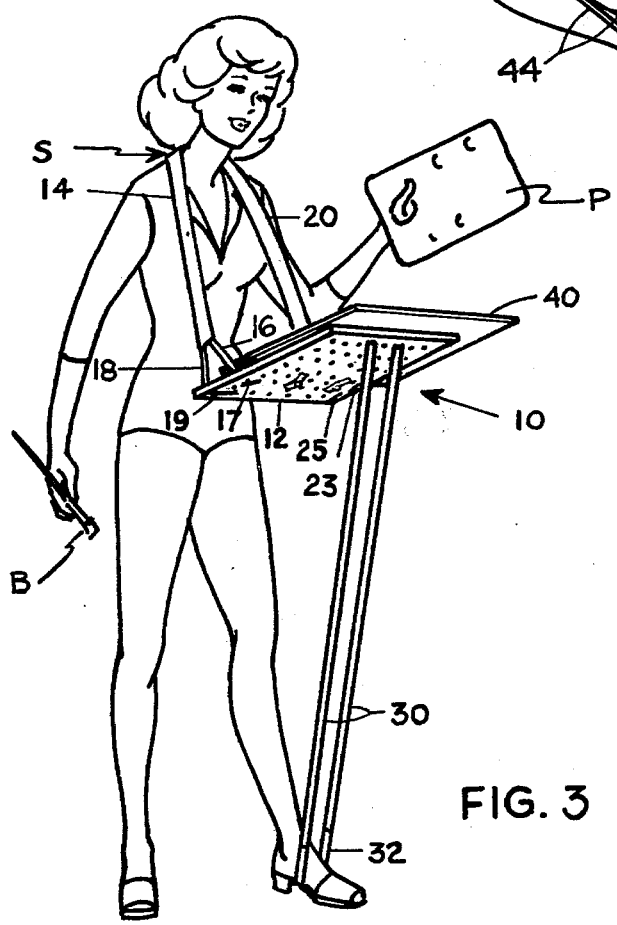
FIG. 5
FIG. 3

EASEL SUPPORT & CARRIER

BACKGROUND OF THE INVENTION

The present invention is generally related to drawing boards and more particularly to drawing or painting boards in the form of easels supported or carried in front of a person's body.

Artists and other persons who have to draw or write for extended periods of time without the benefit of more permanent surfaces on which to support their work are constantly faced with the problem of providing portable or temporary supporting surfaces for their work, such as, drawing papers, canvasses and the like. A number of innovations have been devised to provide such temporary or portable support surfaces. For example, U.S. Pat. No. 1,593,166, issued to C. Flach, discloses a portable drawing board supported in the front of a person's body by a plurality of straps connected to each corner of the drawing board and passed around the person's back and by an additional strap connected to the rear corners of the drawing board and passed under the person's feet. U.S. Pat. No. 643,164, issued to H. Schnell, also discloses a reading or writing desk for hanging over a person's shoulders with a plurality of straps passed around the person's neck and attached at the ends to the respective four corners of the board or desk similar to the support in the Flach patent. In addition, U.S. Pat. No. 346,547, issued to M. Holt, and U.S. Pat. No. 3,363,814, issued to G. Hall et al, both disclose folders or cases designed for suspension in front of a person's body by a strap passed around the person's neck. U.S. Pat. No. 615,480 issued to J. Englund, discloses a somewhat different approach in which a music rack is supported on a person's knee by a rigid strut extending between the person's knee and the music rack, including a flexible strap passed over the strut and under the person's foot to retain the strut in position.

While the above-described inventions have certainly contributed to alleviation of the artist's problems in providing temporary or portable supports for papers, canvasses, and the like, there has still remained a need and desire for an improved drawing board or easel support and carrier that is capable of providing the necessary support for the paper or canvas, but which also would be more versatile in accommodating both sitting and standing positions, freedom of movement for the artist, a minimum of interference with the movement of the artist's hands, and which is comfortable and yet sufficiently stable to support the artist's paper or canvas as well as other supplies during use.

SUMMARY OF THE INVENTION

Accordingly, it is an object of the present invention to provide a novel and improved easel support and carrier so constructed and arranged that the drawing board or easel is for all intents and purposes self-supporting on the artist's body so that both hands are free to hold and use other accessory equipment; yet the support and carrier does not in any way interfere with the movement of the person's arms or hands.

It is also an object of the present invention to provide an easel with supporting apparatus which is conformable for use both in standing and sitting or reclining positions of the artist with the desired stability in all such positions.

It is a further object of the present invention to provide a drawing board or easel adapted for suspension in front of and against a person's body which is capable of supporting drawing pads or canvasses of different sizes and which is adjustable to accommodate a variety of desired positions in front of the person's body and variations in angle or incline of the support surface or easel.

The easel support and carrier of the present invention is comprised of a board having a flat top surface for supporting an artist's drawing pad, canvas and the like, with a first elongated strap attached at its ends to opposite lateral sides of the board and adapted to be passed around the person's neck or back for supporting the board, and a second elongated strap extending downwardly from the front of the board and adapted to pass under the person's foot, both for urging the rear edge of the board against the person's body and for controlling the angle of incline or slope of the board as it is suspended in front of the person's body.

The first strap is adjustable in length, and each end terminates in a pair of strands which are adjustably attached near to the edge of the board to establish the primary support for the board as it is suspended from the person's neck or back in front of his body and in such a way as not to interfere with the use of the board. The second strap is adjustable in length and is passed through two spaced-apart holes in the board adjacent its forward edge such that substantially the entire length of the strap can depend downwardly to pass around the person's foot when in the standing position. Alternatively, a portion of the second strap can be drawn upwardly through the holes and draped over the top surface of the drawing board or easel and downwardly over the rear edge in a manner such that both ends of the looped strap can be passed under the person's foot for increased stability and control. While a lengthened second strap can also accommodate use in this manner when the person is in the standing position, use of the strap in this manner is particularly useful when the artist is in the sitting or reclined position.

The attachment of the strands to the board are adjustable forwardly and rearwardly, and the attachment of the second strap to the board is adjustable laterally from side to side as well as forwardly and rearwardly. These adjustable lengths of the straps allow the easel to accommodate a variety of positions for comfort of the person using it as well as a variety of sizes of persons using it.

BRIEF DESCRIPTION OF THE DRAWING

Other objects, advantages and capabilities of the present invention will become more apparent as the description proceeds taken in conjunction with the accompanying drawings, in which:

FIG. 3 is a perspective view of the easel apparatus as it is properly suspended on a person's body in standing position;

FIG. 4 is a perspective view of the easel apparatus as it is positioned in front of the body of a person sitting on a stool; and FIG. 5 is a perspective view of the easel and its manner of attachment when the painter is in a reclined position.

DETAILED DESCRIPTION OF THE PREFERRED EMBODIMENT

Figure 1:
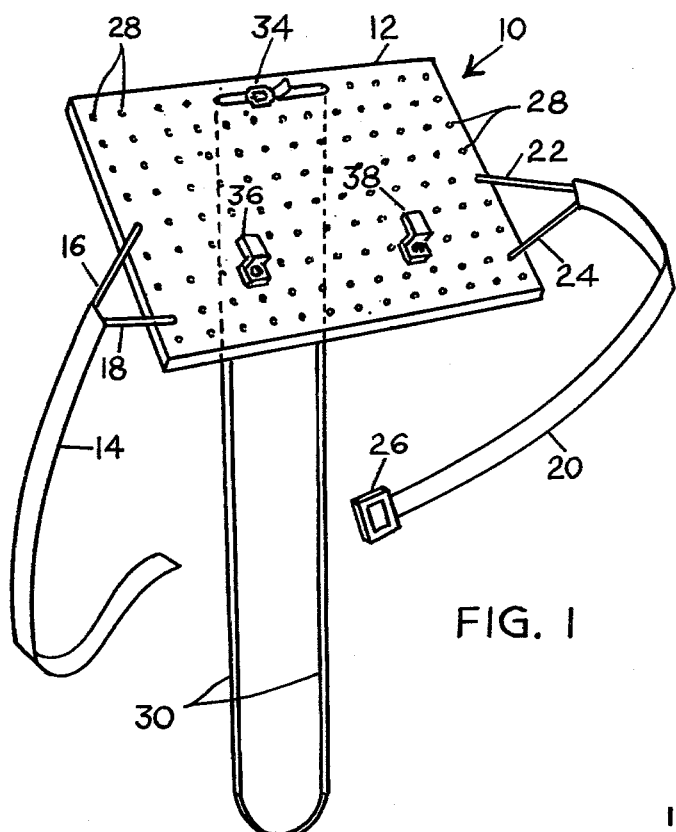
FIG. 1 is a perspective view of the easel apparatus of the present invention taken from a top rear aspect.
Figure 2:
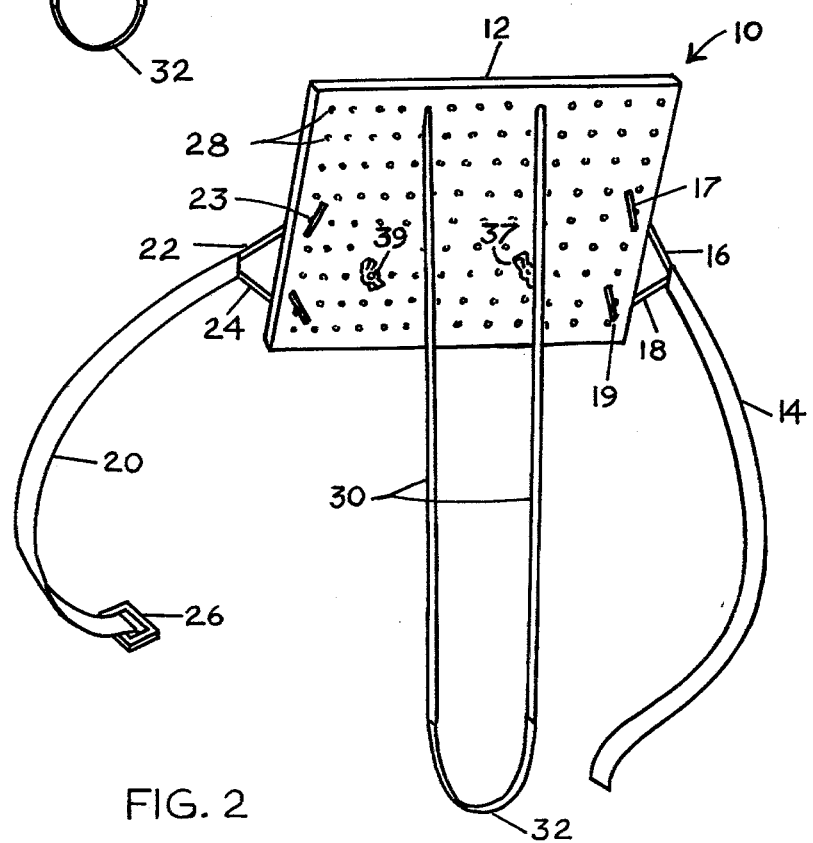
FIG. 2 is a perspective view of the easel apparatus taken from a forward bottom aspect.

The easel support and carrier apparatus 10 formed in accordance with the present invention includes a flat, rectangular board or easel 12 for supporting the artist's work generally represented at 40 and which suitably may be either a drawing pad or canvas as illustrated in FIGS. 3 to 5. The board 12 is supported in front of the person's body by a flexible strap S passed around the person's neck, which strap is preferably separated into a left segment 14 and a right segment 20, illustrated in FIGS. 1 and 2, which can be adjustably connected together by a suitable connector, such as, buckle 26 so that the length of the entire strap can be adjusted in accordance with the desired position of use by an individual artists.

Each strap segment 14, 20 is attached to respective opposite lateral sides of the board 12. Strap segment 14 terminates in a pair of strands 16, 18 which are adapted to pass through selected ones of a plurality of holes 28 in the board 12 and are retained in attachment to the board 12 by releasable fasteners, such as, knots 23, 25 tied in their respective distal ends under the bottom side of the board 12. Likewise, strap segment 20 terminates in a pair of strands 22, 24 which are also passed through selected ones of holes 28 in the board 12 and are retained therein by releasable knots 17, 19 tied in their respective distal ends.

A second strap 30 extends downwardly from the forward edge of the board 12 and passes under the person's foot for additional support and control. The strap 30 is preferably a continuous strap, opposite ends of which are threaded through spaced-apart holes 28 adjacent the forward edge of the board 12 and adjustably connected together by an appropriate connector such as buckle 34. When attached to the board in this manner, the strap 30 is in the form of a continuous loop depending downwardly from the forward edge of the board 12, and the lower extremity of the loop is adapted to pass under the person's foot. At least a portion 32 at the lower extremity of the strap 30 can be elastic to enhance adjustment and maximum comfort to the artist while still maintaining the desired stability and control.

The proper or desired position of the easel and supporting straps suspended from a person's body in a standing position is best shown in FIG. 3. The board 12 is positioned approximately in front of or against the lower abdominal portion of the person's body, and the first strap S made up of left and right segments 14, 20 are connected together and passed around the back of the person's neck, over the front of the person's shoulders, and downwardly to opposite lateral sides of the board where they are attached to the board as described above.

The strands 16, 18 of the left strap segment 14 and the strands 22, 24 of the right strap segment 20 are preferably attached to the respective lateral edges of the board 12 as close to the rear of the board 12 as possible while still providing the necessary support for the board 12. The attachment of the strap segments 14, 20 to the rear portion of the board 12 in this manner, as shown in FIG. 3, offers several advantages in that the strap segments 14, 20 in this position allow the board 12 to accommodate or support oversized drawing boards or canvasses which extend outwardly beyond the front and left and right lateral edges of the board 12 when it is necessary for the artist to work with such oversized materials.

Further, the position of the strap segments 14, 20 near the rear portion of the board 12 do not interfere with the movement of the artist's arms and hands across the drawing surface, since most of the drawing in the artwork is done forwardly of the attachment of the straps to the board.

The strands 16, 18 of the left strap segment 14 and the strands 22, 24 of the right strap segment provide the principal support for the board 12; however, the second strap 30 enhances the stability and control of the board 12. Since the front edge of the board 12 projects a substantial distance outwardly from the person's body, the normal position of the strap 30 looped under the person's foot with a slight tensile pressure applied to the strap causes a rearwardly directed force vector which tends to push the rear edge of the board 12 into the person's body and thereby frictionally resists forward rotation of the board 12 that might otherwise result from the weight of the artist's supplies positioned on the forward portion of the board 12 outwardly from the supporting strands 16, 22. Further, the forward strands 16, 22 of the left and right straps 14, 20, respectively, also resist any tendency of the board to rotate due to the weight placed thereon. Also, the person can vary the slope or inclination of the board 12 upwardly or downwardly by applying or releasing additional tension on the strap 30 by rotating the foot upwardly or downwardly about its heel.

As described above, there are a number of adjustable features provided. The left and right segments 14, 20 of the first strap are adjustably connected together by buckle 26 to provide variable overall length of the first strap. This feature allows the board 12 to be positioned upwardly or downwardly in front of the person's body as is most desirable and comfortable, and it accommodates persons of different heights and physical characteristics. The length of the second strap 30 is also adjustable in the buckle connector 34 to be conformable for use by persons of different heights in different standing or sitting positions.

The attachments of the strands 16, 18, 22, 24 to the board 12 are adjustable forwardly and rearwardly to permit optimum positioning and directing of the support force for vectors acting on the board 12 for stability. The attachment of the second strap 30 to the board 12 is also adjustable forwardly and rearwardly as well as laterally from side to side, and the adjustment of this attachment can be coordinated with the adjustment of the strands for optimum stability while leaving the artist's hands free to hold and use a brush B and paints P, as represented in FIGS. 3 to 5. The board 12 can be perforated with a plurality of holes 28 distributed in a regular pattern over a substantial portion or all of its entire surface to accommodate a variety of positions of attachment of the straps to the board. Preferably, the straps are attached to the board in such a manner that the first strap extends upwardly and rearwardly at an angle of about 60° to 70° and the second strap extends downwardly and rearwardly at an angle of about 60° to 70°. When the straps are connected to the board 12 in the preferred manner described above, the strap S applies an upwardly and rearwardly directed force vector on the board 12 having a horizontal component to vertical component ratio of about $\frac{1}{2}$. Also, the strap 30 applies a downwardly and rearwardly directed force vector on the board 12 having a horizontal component to vertical component ratio of about $\frac{1}{2}$.

FIG. 4 illustrates the use of the easel support and carrier of the present invention with the artist in a sitting position and with the first and second straps rearranged to better accommodate the sitting position while enhancing the stability of the board. The first strap comprised of left and right segments 14, 20 is lowered from the neck to pass around the person's back at approximately waist height. The upper portion of the second strap 30 is drawn upwardly through the holes 28 through which it passes until only a portion thereof is left suspended below the forward edge of the board 12. The remaining portion of the strap 30 that was pulled upwardly through the holes 28 is draped rearwardly over the top surface of the board 12 and downwardly over the rear edge of the board 12. In this manner, both ends of the looped second strap 30 are passed under the person's foot as shown in FIG. 4. This configuration provides increased stability for supporting the board 12 on the person's legs by providing a downwardly directed force from both the front and rear portions of the board 12 with the front portion of the strap 30 also providing a force vector directed rearwardly and downwardly toward the legs, while the first strap around the person's waist provides upwardly and rearwardly directed force in opposition to the downwardly directed forces of straps 30. Even with this substantially increased stability for the board 12 in the position shown in FIG. 4, the position of attachment of the strands 16, 18, 22, 24 to the rear portion of the board 12 still provides the above-described advantages of accommodating larger pads or canvasses and allowing freedom of movement for the person's arms and hands.

A slightly altered embodiment is shown in FIG. 5, wherein the easel is provided with two foot straps 42, 44, rather than the single foot strap 30 described in the preferred embodiment above. All of the remaining features of this embodiment remain the same as the preferred embodiment. Essentially, a front foot strap 42 is attached to the front edge of the board 12 and depends downwardly in a loop which is adapted to pass under the person's foot. In addition, a rear foot strap 44 is attached to the rear edge of the board 12 and also depends downwardly in a loop adapted to pass under the person's foot. Essentially, this embodiment provides similar increased stability characteristics to those described in the configuration of FIG. 4, except that it is accomplished by separate front and rear foot straps, 42, 44 rather than a single foot strap 30 of greater length draped over the top surface of the board 12. Although this alternate embodiment of FIG. 5 is shown on a person sitting on the ground or on a floor, it is to be understood that it is equally conformable for use in a standing position, particularly if the front foot strap 42 and rear foot strap 44 are both of adjustable length to accommodate the greater distance between the board and the person's foot when the board is positioned in front of the person's abdomen as normally desired in the standing position.

Although the present invention has been described with a certain degree of particularity, it is understood that the present disclosure has been made by way of example and that changes in details of structure may be made without departing from the spirit thereof.

I claim:

1. An easel support and carrier assembly comprising:
   a board with a substantially planar top surface and having front and rear edges and left and right side edges;
   a first elongated flexible strap, opposite ends of which are attached to said board adjacent said left and right side edges, said first strap being of sufficient length that it is adapted to be passed around the neck or back of the user;
   a second elongated strap attached to said board adjacent said front edge and being of suffient length that it is adapted to extend downwardly from said board around one or both feet of the user; and
   a third elongated strap extending downwardly from the rear edge of said board and having a looped portion at its lower extremity adapted to pass under the person's foot.

2. The easel support and carrier assembly of claim 1, wherein said one end of said first strap includes a left front strand and a left rear strand, both of which extend from said first strap, the distal ends of said left front and left rear strands being fastened to said board in forward and rearward spaced-apart relation to each other, and said opposite end of said strap includes a right front strand and a right rear strand, both of which extend from said first strap, the distal ends of said right front and right rear strands being fastened to said board in forward and rearward relation to each other.

3. The easel support and carrier assembly according to either of claims 1 or 2, wherein said second elongated strap passes through two spaced-apart holes in said board, and the ends of said second strap are connected together such that said second strap is in the form of a closed loop extending downwardly from said board adjacent the front edge of and opposite ends of said first strap are adjustably attached relatively near the rear edge and away from the front edge of said board.

4. The easel support and carrier assembly of claim 3, wherein said first strap has a left segment and a right segment adjustably connected together such that the effective length of said strap is adjustable, and said ends of said second strap are adjustably connected together such that the effective length of said strap is adjustable.

5. The easel support and carrier assembly of claim 4, wherein at least a portion of said second strap at the midportion of said loop is elastic.

6. The easel support and carrier assembly of claim 5, wherein said left front and said left rear strands are forwardly and rearwardly adjustably attached to said board, said right front and said right rear strands are forwardly and rearwardly adjustably attached to said board, and said second strap is forwardly, rearwardly and laterally adjustably attached to said board.

7. The easel support and carrier assembly of claim 6, including holding means adjustably mounted on the top surface of the board for holding work placed thereon from slipping off the board.

8. Easel support and carrier assembly comprising:
   a generally rectangular board having front and rear edges and left and right opposite side edges, said board having at least two spaced-apart holes therethrough adjacent to said front end;
   first elongated flexible strap means being adjustable in length, each end of which terminates in a pair of strands extending from said first strap, the distal ends of said strands on one end of said first strap including fastener means adjustably attached in openings adjacent to the rear edge portion of said board in spaced-apart relation to each other adjacent said left edge, and the distal ends of said strands on the opposite end of said first strap including fastener means attached in openings adjacent to the rear edge portion of said board in spaced-apart relation to each other adjacent said right edge, said first strap being adapted to pass around the neck or back of a person's body whereby to suspend said board in the front of and against the person's body and to impart an upwardly and rearwardly directed force on said board; and second elongated flexible strap means, said second strap means being adjustable in length, wherein said second strap means is threaded through said holes and has its ends connected together to form an endless enclosed loop adapted to extend downwardly from the front edge of said board to pass under the person's foot at one end of the loop when the person is standing and to be selectively drawn partially upwardly through said holes and draped over the top surface and downwardly over the rear edge of said board to pass under the person's foot at both ends of the loop when said person is sitting.

9. The easel support and carrier assembly of claim 8, wherein first strap extends upwardly and rearwardly from said board to the person's neck at an angle in the range of approximately 60° to 70° to the plane of the board, and said second strap extends downwardly and rearwardly from said board at an angle in the range of approximately 60° to 70° whereby the force vector applied by said first strap and said board has a rearwardly directed horizontal component to upwardly directed vertical component ratio in the range of approximately ½, and the force vector applied by said second strap on said board has a rearwardly directed horizontal component to downwardly directed vertical component ratio in the range of approximately ½.

10. The easel support and carrier apparatus of claim 9, wherein said board is perforated with a plurality of holes therethrough distributed over substantially its entire area.

11. Easel apparatus, comprising:
a board with a flat top surface and front, rear, left and right lateral edges;
a first elongated strap, one end of which is attached to said board adjacent said left edge and the opposite end of which is attached to said board adjacent said right edge, said first strap being of sufficient length and adapted to pass around the rear of a person's body as said board is positioned in front of the person's body;
a second elongated strap extending downwardly from the front edge of said board and having a looped portion at its lower extremity adapted to pass under the person's foot; and
a third elongated strap extending downwardly from the rear edge of said board and having a looped portion at its lower extremity adapted to pass under the person's foot.

* * * * *